United States Patent
Jian et al.

(10) Patent No.: US 10,853,704 B2
(45) Date of Patent: Dec. 1, 2020

(54) MODEL-BASED IMAGE LABELING AND/OR SEGMENTATION

(71) Applicant: Clarifai, Inc., New York, NY (US)

(72) Inventors: Yanan Jian, New York, NY (US); Matthew Zeiler, New York, NY (US); Marshall Jones, New York, NY (US)

(73) Assignee: Clarifai, Inc., New York, NY (US)

(*) Notice: Subject to any disclaimer, the term of this patent is extended or adjusted under 35 U.S.C. 154(b) by 105 days.

(21) Appl. No.: 16/223,947

(22) Filed: Dec. 18, 2018

(65) Prior Publication Data

US 2020/0193246 A1    Jun. 18, 2020

(51) Int. Cl.
    *G06K 9/66*      (2006.01)
    *G06T 7/174*     (2017.01)
    *G06N 3/04*     (2006.01)

(52) U.S. Cl.
    CPC ............ *G06K 9/66* (2013.01); *G06N 3/04* (2013.01); *G06T 7/174* (2017.01)

(58) Field of Classification Search
    CPC ............ G06K 9/66; G06T 7/174; G06N 3/04
    See application file for complete search history.

(56) References Cited

U.S. PATENT DOCUMENTS

| | | | | |
|---|---|---|---|---|
| 9,202,130 | B2* | 12/2015 | Baba | G06K 9/46 |
| 2014/0126810 | A1* | 5/2014 | Wang | G06T 7/174 |
| | | | | 382/165 |
| 2016/0292876 | A1* | 10/2016 | Zhao | G06T 7/143 |
| 2017/0039417 | A1* | 2/2017 | Saruta | G06K 9/00228 |
| 2017/0300617 | A1* | 10/2017 | Georgescu | G16B 40/00 |
| 2019/0340728 | A1* | 11/2019 | Jampani | G06K 9/6218 |

* cited by examiner

*Primary Examiner* — Ming Y Hon
(74) *Attorney, Agent, or Firm* — Pillsbury Winthrop Shaw Pittman LLP

(57) ABSTRACT

In some embodiments, reduction of computational resource usage related to image labeling and/or segmentation may be facilitated. In some embodiments, a collection of images may be used to train one or more prediction models. Based on a presentation of an image on a user interface, an indication of a target quantity of superpixels for the image may be obtained. The image may be provided to a first prediction model to cause the prediction model to predict a quantity of superpixels for the image. The target quantity of superpixels may be provided to the first model to update the first model's configurations based on (i) the predicted quantity and (ii) the target quantity. A set of superpixels may be generated for the image based on the target quantity, and segmentation information related to the superpixels set may be provided to a second prediction model to update the second model's configurations.

19 Claims, 10 Drawing Sheets

MODEL-BASED IMAGE LABELING AND/OR SEGMENTATION

FIELD OF THE INVENTION

The invention relates to model-based labeling or segmentation, including, for example, superpixel image labeling or image segmentation via one or more machine learning models or other prediction models.

BACKGROUND OF THE INVENTION

In recent years, the field of artificial intelligence and machine learning has experienced a resurgence due to advances in the performance of computer hardware, sizes of training sets, theoretical understanding of artificial intelligence, and other advances. This resurgence has enabled many advances in other technical fields, including recognition or other prediction systems. To train a prediction model to recognize concepts (e.g., objects, states, etc.) in an image, some systems may rely on users to specify the location of instances of a concept in one or more images via the use of bounding boxes. As an example, a user may add a bounding box to a region of an image and add/modify an associated label (e.g., specifying a name for the concept), and the bounding box information and the associated label may be used to train the prediction model. In most cases, however, the bounding box is not an accurate representation of the contours of the concept and includes a substantial amount of the image's background. With respect to such systems, accurate information specifying such contours is not typically provided to the prediction model, which may result in less effective training of the prediction model.

Although superpixel labeling techniques can help identify contours in an image, highly accurate superpixel labeling require a substantially large quantity of superpixels to be generated for an image with complex renderings (e.g., to more accurately represent a person's hairs or other contours of the person in a high-definition photo), thereby requiring a significant amount of computational resources and time to do so. While the same substantially large quantity of superpixels are not needed to accurately represent the contours of simple renderings (e.g., a black and white image of a 2D circle), typical existing labeling systems do not have an efficient way of processing a collection of images having renderings with a range of complexities. These and other drawbacks exist.

SUMMARY OF THE INVENTION

Aspects of the invention relate to methods, apparatuses, and/or systems for image labeling or segmentation via a machine learning model or other prediction model, training of the prediction model, or reduction of computational resource usage related to the image labeling or segmentation or the prediction model training.

In some embodiments, an indication of a target quantity of segments for an image may be obtained, and a set of segments (e.g., of different sizes or shapes) may be generated based on the target quantity. As an example, the segment set may include superpixels associated with the image or other types of segments. In one use case, a set of superpixels may include a subset of superpixels reflecting a concept in the image and a subset of superpixels reflecting one or more other portions of the image. In some embodiments, the image may be provided for presentation on a user interface to solicit the desired target quantity of superpixels from a user. As an example, the user may select a region of interest and specify a quantity of superpixels for the selected region. The user may also select one or more other regions of interest and specify a quantity of superpixels for each of the other regions. In some embodiments, the user input may be used to train the prediction model, for example, such that the prediction model learns to indicate less superpixels for simpler renderings (e.g., thereby, reducing computational resources used to generate the superpixels) or to indicate more superpixels for complex renderings (e.g., thereby increasing the accuracy of the superpixels for representing such complex renderings), as described in greater detail herein.

Various other aspects, features, and advantages of the invention will be apparent through the detailed description of the invention and the drawings attached hereto. It is also to be understood that both the foregoing general description and the following detailed description are exemplary and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
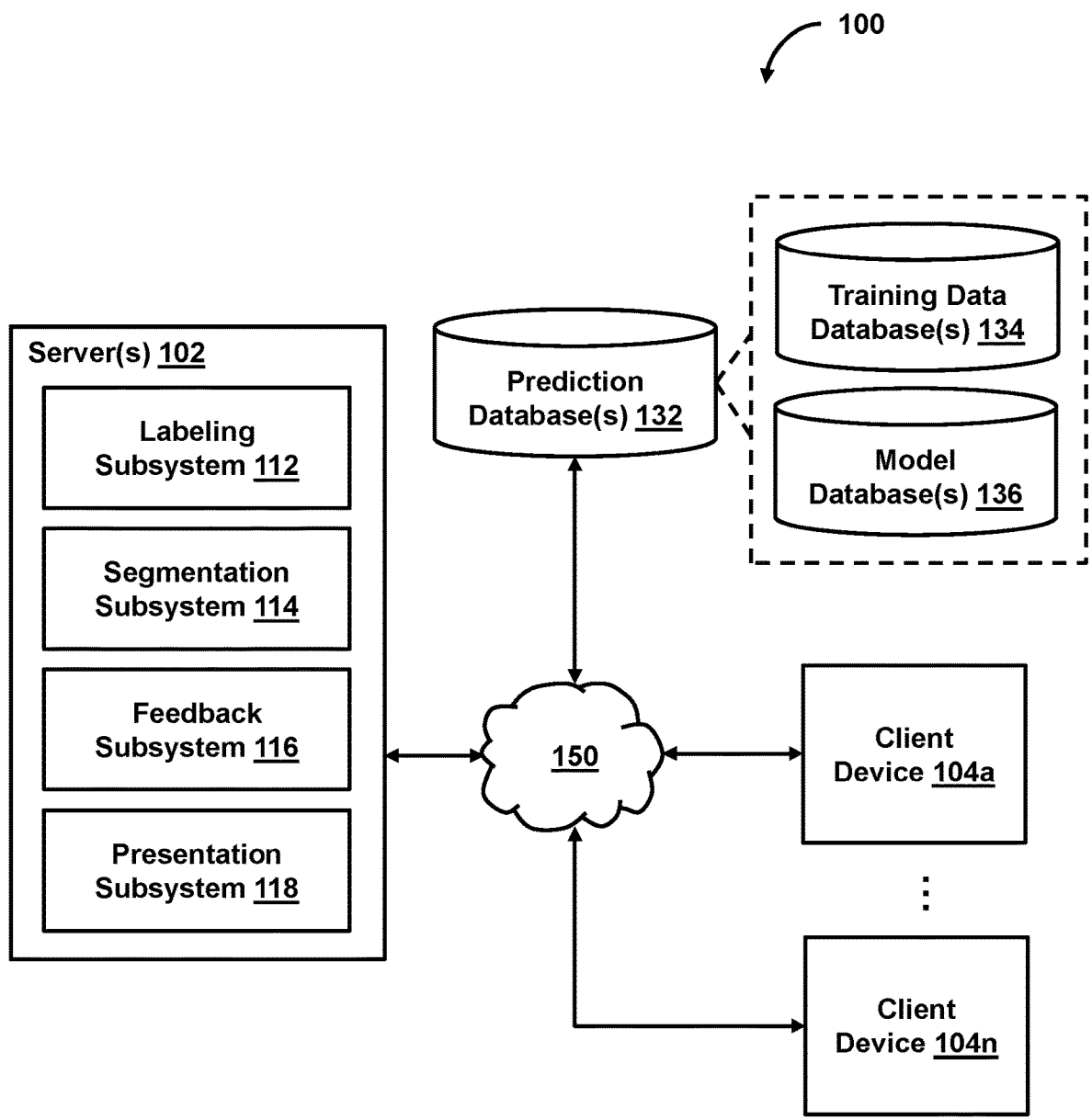
FIGS. 1 and 1A-1C show systems for facilitating model-based labeling or segmentation, in accordance with one or more embodiments.

FIG. 1 shows a system 100 for facilitating model-based labeling or segmentation, in accordance with one or more embodiments. As shown in FIG. 1, system 100 may include server(s) 102, client device 104 (or client devices 104a-104n), or other components. Server 102 may include labeling subsystem 112, segmentation subsystem 114, feedback subsystem 116, presentation subsystem 118, or other components. Each client device 104 may include any type of mobile terminal, fixed terminal, or other device. By way of example, client device 104 may include a desktop computer, a notebook computer, a tablet computer, a smartphone, a wearable device, or other client device. Users may, for instance, utilize one or more client devices 104 to interact with one another, one or more servers, or other components of system 100. It should be noted that, while one or more operations are described herein as being performed by particular components of server 102, those operations may, in some embodiments, be performed by other components of server 102 or other components of system 100. As an example, while one or more operations are described herein as being performed by components of server 102, those operations may, in some embodiments, be performed by components of client device 104. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

Figure 2:
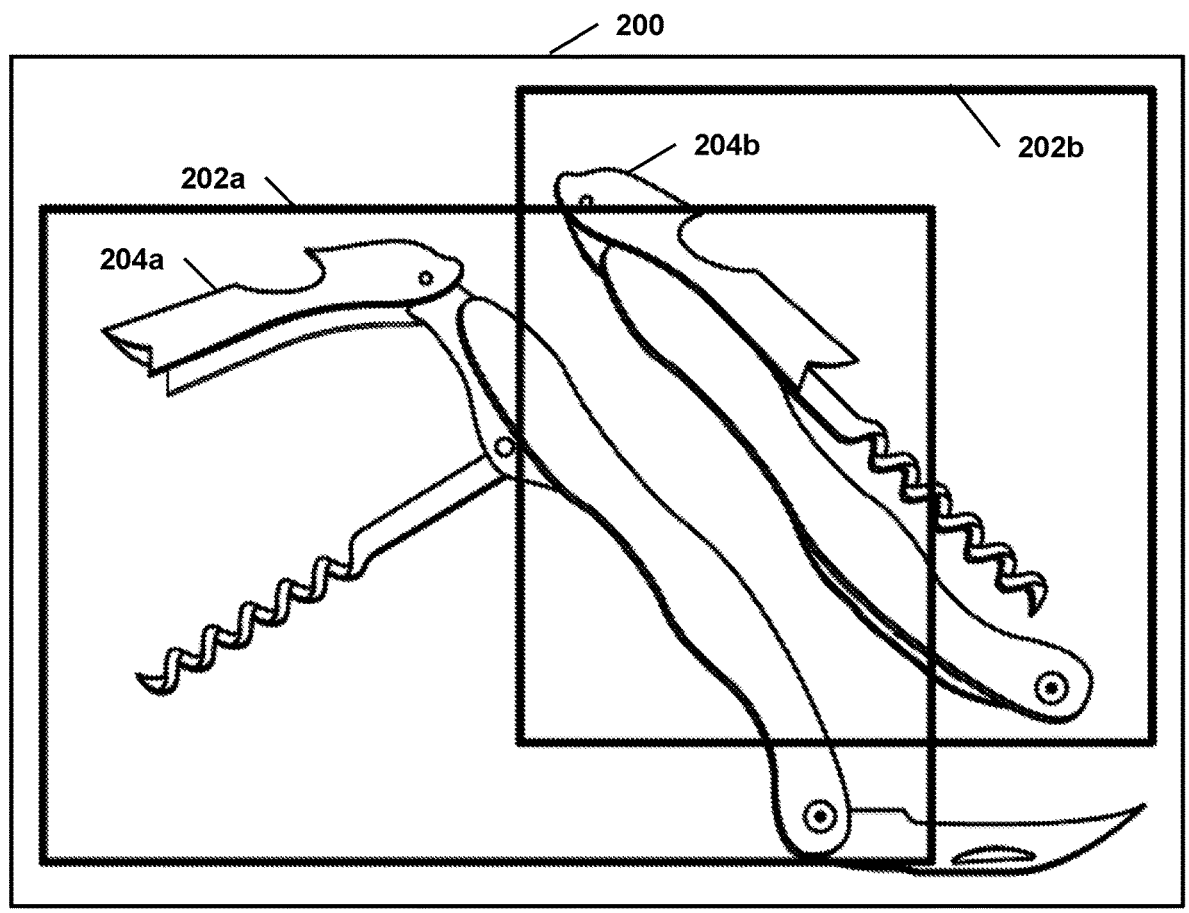
FIG. 2 shows an image having two instances of a concept and a rendering of bounding boxes over the two concepts, in accordance with one or more embodiments.

In some embodiments, system 100 may perform labeling of an image (or other content item) via superpixels (or other segments), determine segments for one or more concepts in the image, or train a neural network or other prediction model to perform such labeling or segmentation. As an example, concepts may include objects (e.g., "dog," "tree," "person," "chair," "table," etc.), patterns, current states (e.g., indicating that a door is closed, a room is messy, a construction site is safe, etc.), or other concept identifiable in an image, audio, video, or other content item. As discussed, although bounding boxes (e.g., user-specified bounding boxes) can provide a prediction model with supplemental training information, typical bounding box information does not accurately represent the contours of a concept in an image and includes a substantial amount of the image's background. As shown in FIG. 2, for example, two bounding boxes 202*a* and 202*b* are rendered over an image 200 of corkscrews to indicate the locations of concept instances 204*a* and 204*b* of the corkscrews. Although image 200 and information regarding bounding boxes 202*a* and 202*b* (e.g., their locations, sizes, boundaries, etc.) may be used to train the prediction model, bounding boxes 202*a* and 202*b* does not specify the contours of the waiter corkscrew instances 204*a* and 204*b* in image 200, thereby failing to provide such training information for the prediction model. Although some systems may obtain contour training information via typical polygon segmentation techniques, such techniques do not generate accurately representations of the contours of non-polygon shapes (e.g., oval, circle, or other shapes) or other contours that include non-straight lines.

To address one or more issues described above, in some embodiments, system 100 may generate superpixels or other non-polygon segments (or other segments) to represent contours in images (or other content items). As an example, superpixels may be generated for an image (e.g., a video frame or other image) via Boundary-Aware Superpixel Segmentation (BASS), Simple Linear Iterative Clustering (SLIC), or other techniques. In one use case, with respect to SLIC, local k-means clustering may be performed to generate a set of superpixels, where image pixels are iteratively assigned to neighborhood superpixels with close pixel gray value and spatial location. Moreover, in some embodiments, to address one or more issues described above with respect to superpixel labeling, reference feedback related to a quantity of superpixels may be used to train a prediction model to better predict the target quantity of superpixels to be generated for images or respective regions of images, as described herein.

In some embodiments, system 100 may generate a set of segments (e.g., of different sizes or shapes) that together reflect a concept in an image. In some embodiments, system 100 may obtain an indication of a target quantity of segments for the image (e.g., an indication provided by a user, a model-generated number, etc.) and generate, based on the target quantity, the segment set reflecting the concept in the image. The segment set may include superpixels associated with the image or other types of segments. As an example, a set of superpixels may include a subset of superpixels reflecting the concept in the image (and corresponding to the target quantity of superpixels) and a subset of superpixels reflecting one or more other portions of the image. In some embodiments, system 100 may provide the image for presentation on a user interface to solicit the desired target quantity of superpixels from a user and, in response, obtain the target quantity (of superpixels) from the user. In one use case, the user may select a region of interest and specify a quantity of superpixels for the selected region. The user may also select one or more other regions of interest and specify a quantity of superpixels for each of the other regions. In this way, for example, the user input may be used to reduce the number of superpixels that is to be generated for the image (e.g., for simpler renderings to be represented by superpixels), thereby reducing the computational resources used to generate the superpixels. Alternatively, the user input may be used to increase the number of superpixels that is to be generated for the image (e.g., for complex renderings, such as a high-definition photo of a person, to more accurately represent the person's hairs or other contours of the person), thereby increasing the accuracy of the superpixels for representing the contours of more complex renderings.

Figure 1A:
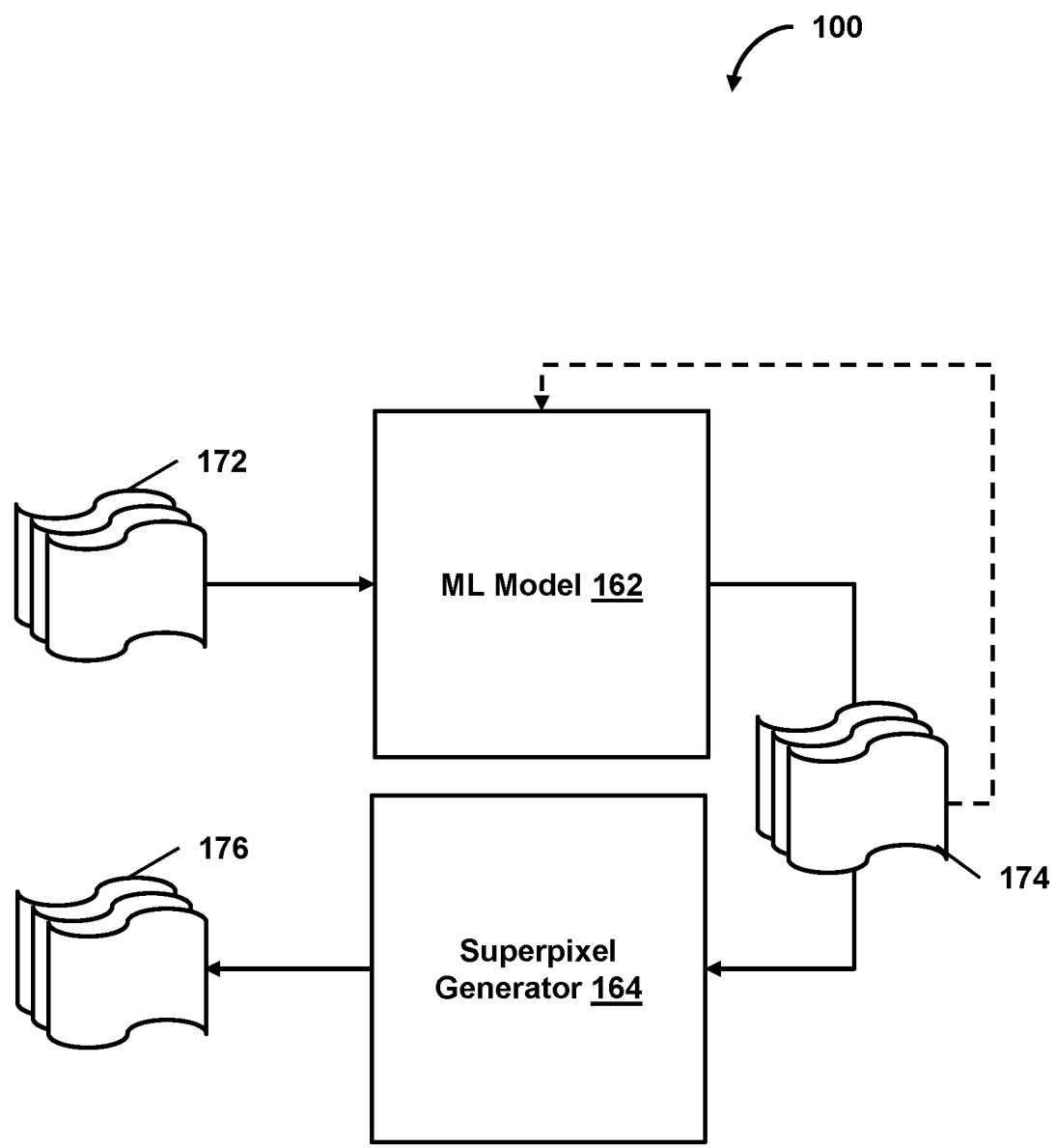

In some embodiments, system 100 may obtain an image and provide the image to a prediction model to cause the prediction model to predict a quantity of segments for the image (e.g., a quantity of superpixels for the overall image, for a region of the image, etc.) or generate other predictions related to the image. In some embodiments, as part of training the prediction model, system 100 may provide one or more target output indications related to the image as reference feedback to the prediction model to train the prediction model. As an example, system 100 may obtain an indication of a target quantity of segments for the image and provide the target quantity of segments as reference feedback to the prediction model. The reference feedback may cause the prediction model to assess the predicted quantity (e.g., against the target quantity), and the prediction model may update one or more portions of the prediction model based on its assessment (e.g., updating its configurations, such as its weights, biases, or other parameters). As an example, with respect to FIG. 1A, one or more images 172 may be provided to machine learning model 162, and machine learning model 162 may predict a quantity 174 of superpixels for each of the images 172. For each image 172, the predicted quantity 174 and the image 172 may be provided to superpixel generator 164 to generate superpixels 176.

In some embodiments, system 100 may provide the image for presentation on a user interface to solicit a desired target quantity of superpixels from a user (e.g., a quantity of superpixels for the overall image, for a region of the image, etc.) and, in response, obtain the target quantity (of superpixels) from the user. In this way, the user input may be used to train the prediction model, for example, such that the prediction model learns to indicate less superpixels for simpler renderings (e.g., thereby, reducing computational resources used to generate the superpixels) or to indicate more superpixels for complex renderings (e.g., thereby increasing the accuracy of the superpixels for representing such complex renderings). As an example, the prediction model may be trained to indicate less superpixels for a rendering of a circle, as compared to the number of superpixels for a rendering of a person (e.g., thereby, decreasing the computational resource usage for superpixel labeling of such simpler renderings). As a further example, the prediction model may be trained to indicate less superpixels for one or more regions of an image that include simpler renderings, as compared to the number of superpixels for one or more other regions of the image that include more complex renderings (e.g., thereby, indicating region-specific quantities of superpixels based on the complexity of the renderings of the respective regions). In one use case, with respect to the foregoing FIG. 1A example, user feedback related to the predicted quantities 174 may be obtained and provided to machine learning model 162, and machine learning model 162 may update its configurations based on the user feedback and the predicted quantities 174. For example, the selected regions of interests and the user-indicated quantities of superpixels for each of the selected regions may be provided as training inputs to machine learning model 162 to facilitate its training.

In some embodiments, the prediction model may include one or more neural networks or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

As an example, after the target quantity of segments are provided as reference feedback to the prediction model, the prediction model may update its configurations (e.g., weights, biases, or other parameters) based on its assessment of its prediction and the target quantity of segments. In one use case, where the prediction model is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the prediction model may be trained to better predict the quantity of segments to be generated for images or respective regions of images (or other content items).

Subsystems 112-118

Figure 3A:
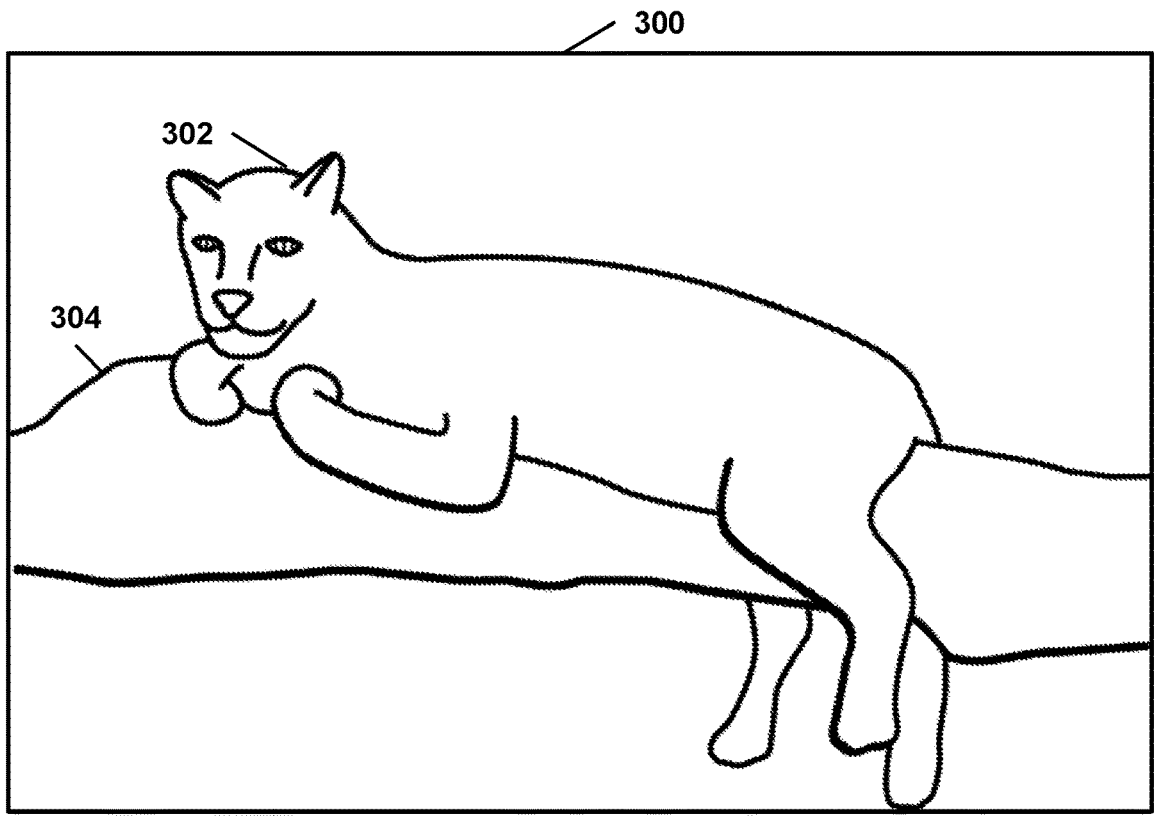
FIGS. 3A and 3B show an image having a concept and a rendering of superpixels over the concept, in accordance with one or more embodiments.
Figure 3B:
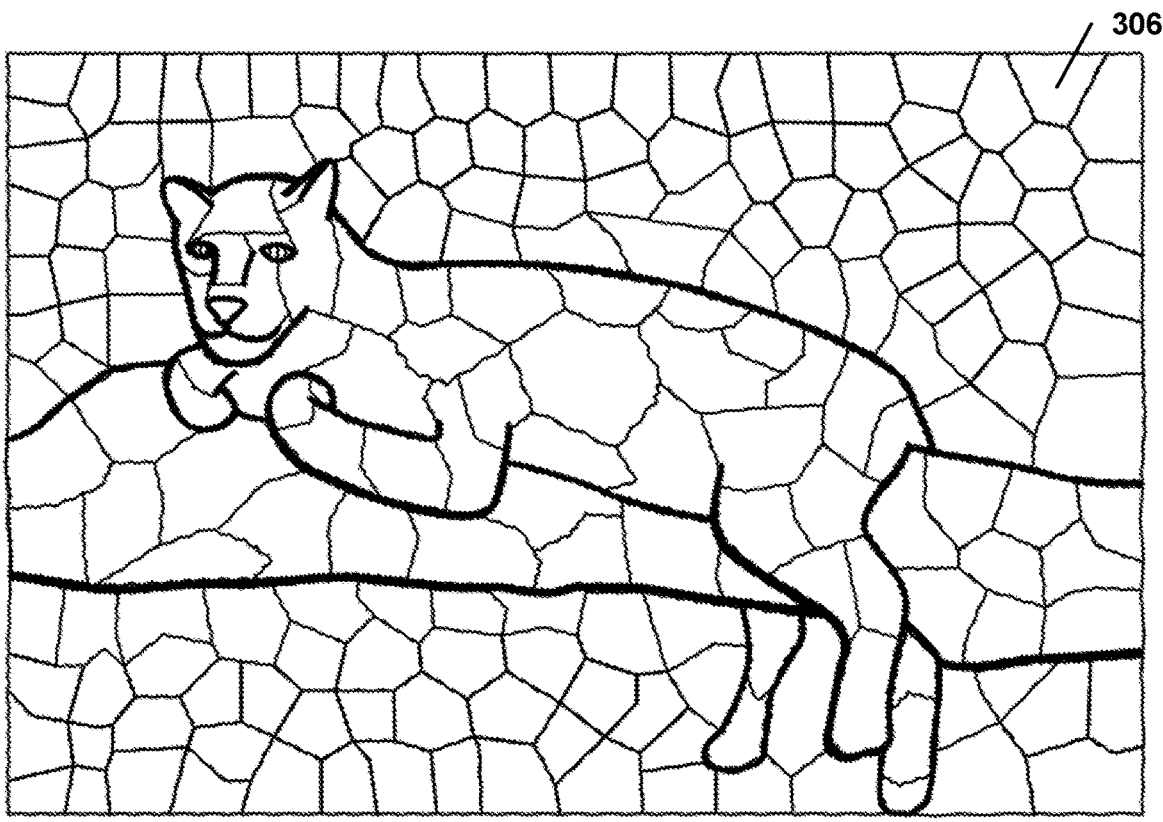

In some embodiments, labeling subsystem 112 or segmentation subsystem 114 may generate a set of segments with respect to an image, where the segment set includes one or more segments reflecting a first concept in the image, segments reflecting a second concept in the image, segments reflecting a third concept in the image, etc., or segments reflecting one or more other portions of the image. In some embodiments, the segment set includes a combination of segments of different sizes or shapes that reflect a concept in the image. In some embodiments, the segment set includes a combination of superpixels that reflect the concept in the content item. As an example, with respect to FIG. 3A, image 300 includes a first concept (e.g., a lion or other animal) represented by segment set 302 and a second concept (e.g., a branch or other object) represented by segment set 304. Each of the segment sets 302 and 304 may be generated via pixel-level segmentation (e.g., where each pixel is indicated as either 1 or 0 with respect to a given concept), via superpixel segmentation (e.g., BASS, SLIC, etc.), or via other techniques. As shown in FIG. 3B, with respect to superpixel segmentation, a set of superpixels 306 may be generated such that a first subset of superpixels 306 represent the lion (or other animal), a second subset of superpixels 306 represent the branch (or other object), and other superpixels 306 represent aspects of the image background.

Figure 4A:
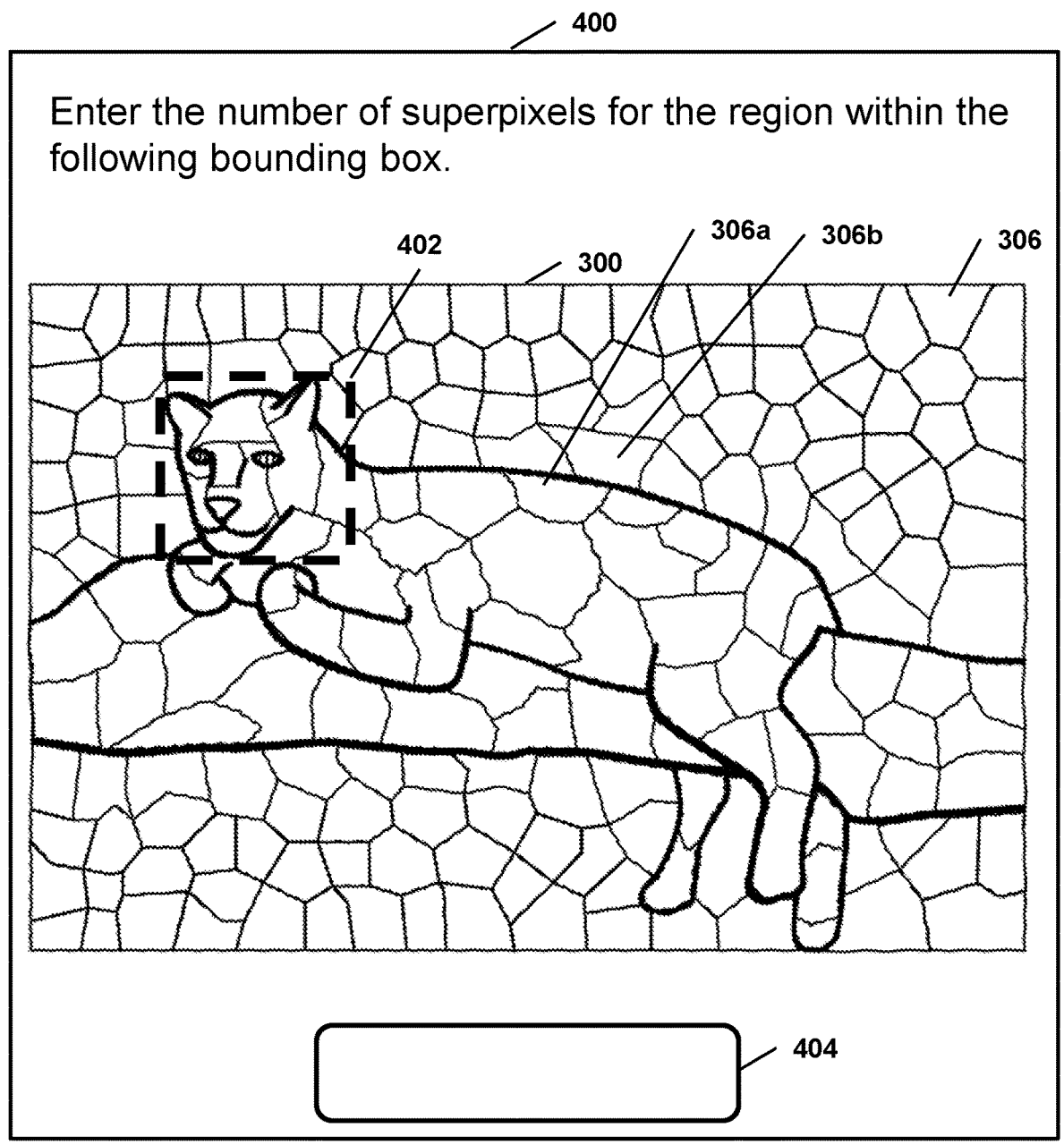
FIGS. 4A and 4B show user interfaces for soliciting user input to facilitate segmentation of a concept, in accordance with one or more embodiments.
Figure 4B:
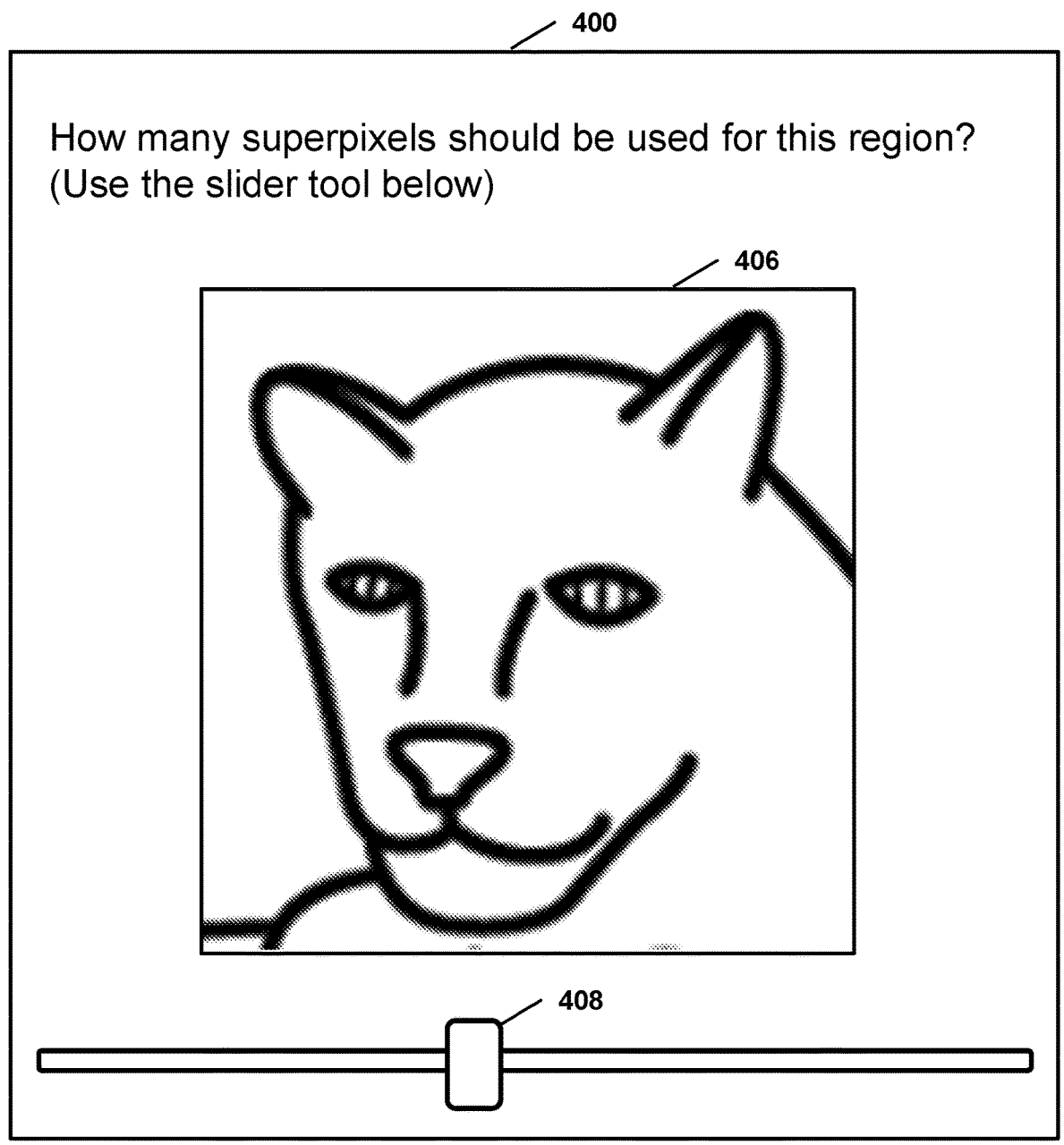

In some embodiments, labeling subsystem 112 may obtain an indication of a target quantity of segments to be generated with respect to an image, and labeling subsystem 112 may generate a set of segments based on the target quantity. In some embodiments, the target quantity may be obtained from a prediction model that predicts the quantity of segments for the image (or for a respective concept in the image) (e.g., predicting the quantity of segments to accurately represent the contours of the concept in the image). In some embodiments, the target quantity may be obtained from a user (or based on the user's input). As an example, presentation subsystem 118 may provide the image on a user interface for presentation to the user, and feedback subsystem 116 may obtain the target quantity via the user interface based on the presentation of the image to the user. In one use case, with respect to FIG. 4A, user interface 400 may present a user with image 300 with bounding structure 402 (e.g., a bounding box or other structure over the animal's head) along with an inquiry soliciting the user to provide an indication of a target quantity of segments (e.g., for the region within bounding structure 402). As shown in FIG. 4A, the inquiry may ask the user to specify the number of superpixels for the region of the image within bounding structure 402, and user interface 400 may present the user with input field 404 to enable the user to specify the answer to the inquiry. In another use case, with respect to FIG. 4B, the inquiry may ask the user to specify a range of superpixels or other estimate of the target quantity of superpixels to be generated for the region of the image within bounding structure 402. Based on the target quantity, a set of superpixels may be generated for the region of the image within bounding structure 402.

In some embodiments, labeling subsystem 112 or segmentation subsystem 114 may provide one or more images, segment information related to the images, or other information (e.g., target output indications) to a prediction model to label aspects of the images (e.g., superpixel labeling, concept labeling, etc.) or train the prediction model to perform such labeling. In some embodiments, a collection of images related to a concept (e.g., 50 or more images, 100 or more images, 500 or more images, 1000 or more images, 10000 or more images, 100000 or more images, 1000000 or more images, etc.) and provide the images or segment information to the prediction model to train the prediction model. As an example, with respect to an image, the segmentation information may indicate a target quantity of superpixels (or other segments) for a region of the image, a target quantity of superpixels (or other segments) for the overall image, or other information. As another example, with respect to a concept in an image, the segment information may indicate (i) which segments of a set of segments (determined for the image) that reflect the concept in the image, (ii) a location or area of the image corresponding to the segments reflecting the concept, (iii) a user selection of a subset of segments of the segment set as a positive example of the concept in the image, (iv) a user selection of a subset of segments of the segment set as a negative example of the concept in the image, (v) user selections of a subset of segments of the segment set as a positive or negative example of other concepts in the image, or (vi) other information.

In some embodiments, labeling subsystem 112 may generate an initial set of segments for an image, and presentation subsystem 118 may cause presentation of the initial set of segments over the image on a user interface. Based on the presentation of the initial set of segments, feedback subsystem 116 may obtain a first indication of a first target quantity of segments for a first region of the image via the user interface. In some embodiments, labeling subsystem 112 may provide the first target quantity of segments as reference feedback to a prediction model. The prediction model may assess the first target quantity of segments against its predicted target quantity for the first region of the image. Based on its assessment, the prediction model may update one or more portions of the prediction model (e.g., the model's configurations, such as its weights, biases, or other parameters). As an example, with respect to FIG. 1A, one or more images 172 may be provided to machine learning model 162, and machine learning model 162 may predict 40 superpixels for a region represented with (x1,y1,w1,h1) and 32 super pixels for a different region (x2, y2, w2, h2) within one of the images. In addition, machine learning model 162 may predict different regions and a different number of superpixels in each of the regions for the rest of the images.

In one use case, with respect to FIG. 4A, the set of superpixels 306 may initially be presented over image 300 on user interface 400. The user may activate a bounding structure tool of user interface 400 to use bounding structure 402 to select a region of image 300 and specify a quantity of superpixels to be generated for the selected region (within bounding structure 402). With respect to FIG. 4B, user interface 400 may additionally enable the user to (i) zoom in (or zoom out) on a region or move (or modify) interface boundaries 406 to select the region, (ii) specify the quantity of superpixels for the selected region (e.g., by operating a sliding tool with a sliding component 408 that enables the user to specify a range of superpixels or other estimate of the target quantity of superpixels), or perform other actions. Based on the user input (e.g., the selected region, the specified quantity of superpixels, etc.), a new set of superpixels may be generated for the selected region and presented over the selected region of image 300 on user interface 400. As a further example, based on the user input, reference feedback (e.g., feedback indicating the selected region, the specified quantity of superpixels for the selected region, etc.) may be provided to a prediction model. In response, the prediction model may assess the reference feedback against the prediction model's prediction and update its configurations based on its assessment.

In another use case, with respect to FIG. 4A, after moving and modifying the bounding structure 402 to correspond a select region of image 300, the user may specify a target number of superpixels for the selected region that is greater than the number of superpixels currently presented over the selected region on user interface 400 (e.g., for more accurate superpixel labeling of the animal's hairs, facial features, or other characteristics of the animal's head). For example, the user may specify that this greater number of superpixels should be generated for the selected region, and, as a result, the prediction model may be updated based on the specified number of superpixels, characteristics of the portion of image 300 within the selected region, or other information to better recognize image characteristics that require a greater number of superpixels for sufficiently accurate superpixel labeling.

In a further use case, the user may repeat the foregoing actions with respect to one or more other regions of image 300, such as a sub-region within the initially-selected region (e.g., within boundary structure 402 shown in FIG. 4A), another region of image 300 overlapping with the initially-selected region, another region of image 300 that does not overlap with the initially-selected region, etc. In response to each set of user inputs (e.g., a selected region, the specified quantity of superpixels for the selected region, etc.), a new set of superpixels may be generated for the selected region and presented over the selected region of image 300 on user interface 400. Additionally, or alternatively, reference feedback (e.g., feedback indicating the selected region, the specified quantity of superpixels for the selected region, etc.) may be provided to the prediction model, which may update its configurations based on the reference feedback. Through the user's actions (e.g., and other user's actions) of specifying target quantities of superpixels for regions of image 300 (e.g., and other images), the prediction model may be updated to more accurately predict the quantity of superpixels required for optimal superpixel labeling of images (e.g., more accurate superpixel labeling of images by increasing the number of superpixels for certain regions with complex renderings, more efficient superpixel labeling of images by decreasing the number of superpixels for certain regions with simple renderings, etc.).

In some embodiments, in response to a presentation of an image on a user interface, feedback subsystem 116 may obtain a first indication of a first target quantity of segments for a first region of the image, a second indication of a second target quantity of segments for a second region of the image, a third indication of a third target quantity of segments for a third region of the image, and so on. In response to obtainment of the target quantity indications, labeling subsystem 112 may generate a set of segments for each of the respective regions via BASS, SLIC, or other techniques. As an example, a first set of segments may be generated for the first region based on the first target quantity of segments, a second set of segments may be generated for the second region based on the second target quantity of segments, and a third set of segments may be generated for the third region based on the third target quantity of segments.

Figure 1B:
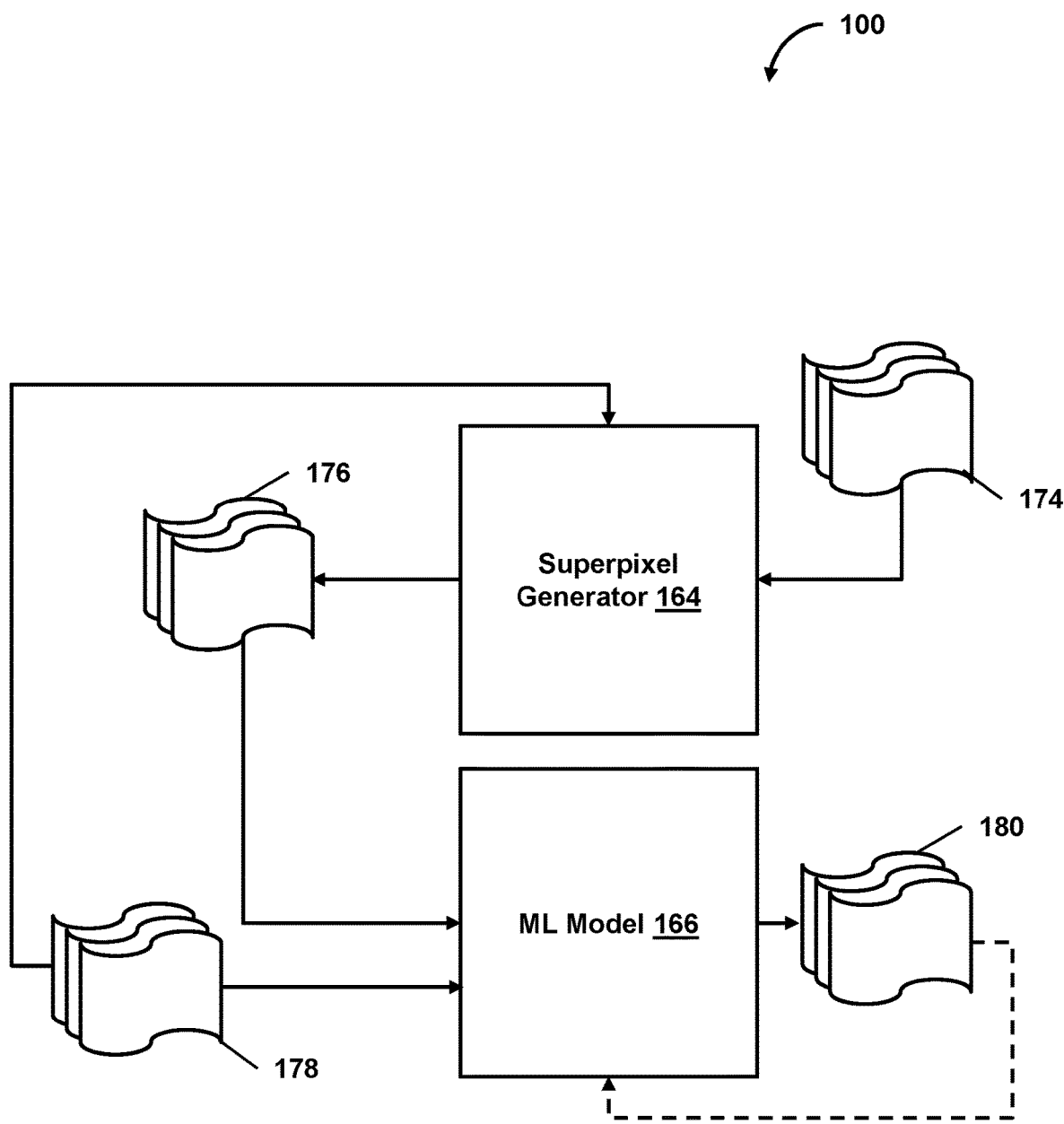

In some embodiments, feedback subsystem 116 may provide reference feedback to a prediction model to train the prediction model, where the reference feedback includes segmentation information, such as the segments (e.g., for some or all the regions of the image) or other information. For example, segmentation subsystem 112 may provide the image to the prediction model to cause the prediction model to perform pixel-level segmentation of the image to identify one or more concepts in the image (e.g., for each pixel of the image, predicting whether or not the pixel relates to a particular concept, generating segments representing the concept and segments representing one or more other concepts, etc.). In response to providing the prediction model with the foregoing reference feedback, the prediction model may assess the reference feedback against the predictions and update its configurations based on the assessment. In one use case, with respect to FIG. 1B, one or more images 178 and quantities 174 of superpixels for the images 178 may be provided to superpixel generator 164 to generate superpixels 176 for each of the images 178. The images 178 may also be provided to the prediction model (e.g., machine learning model 166), and the prediction model may generate a set of segments 180 for each of the images 178. As part of training the prediction model, for each image, the superpixels 176 for the image may be provided as reference feedback to the prediction model, and the prediction model may update its configurations based on the reference feedback and the set of segments 180 for the image.

As a further example, with respect to FIG. 4A, the prediction model may have predicted that a first set of segments of image 300 relate to a first concept (representative of a lion) and a second set of segments of image 300 does not correspond to the first concept (e.g., and corresponds to a second concept), but some segments of the predicted first and second sets may correspond to the same superpixel 306. In one use case, some segments of each predicted set map to superpixel 306a which represent a part of a lion. In another use case, some segments of each predicted set map to superpixel 306b which does not represent a part of the lion). As such, the set of superpixels 306 (or other segmentation derived therefrom) may be provided as reference feedback to the prediction model to cause the prediction model to update its configurations so that its prediction predictions may avoid one or more inconsistencies with the reference feedback. Thus, for example, the prediction model may increase the accuracy of its segmentation for identifying concepts in images (e.g., identifying whether or which segments correspond to a given concept and which segments do not correspond to the given concept).

As an example, after the reference feedback is to the prediction model, the prediction model may update its configurations (e.g., weights, biases, or other parameters) based on its assessment of its prediction and the reference feedback. In one use case, where the prediction model is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the prediction model may be trained to perform more accurate segmentation of images (e.g., with respect to one or more concepts in such images).

In some embodiments, labeling subsystem 112 may provide an image related to a concept to a first prediction model to cause the first prediction model to predict a quantity of segments for the image (or for respective regions of the image). As an example, the predicted quantity of segments may be used as an input parameter to a superpixel labeling application (e.g., incorporating BASS, SLIC, or other techniques) to generate superpixels for the image, and the image and the superpixels may be presented to a user via a user interface. As described herein with respect to FIGS. 4A and 4B, the user may perform one or more rounds of specifying a target quantity of superpixels for a selected region. With respect to each round, the specified quantity of superpixels and information indicating the selected region may be provided to the superpixel labeling application to generate superpixels for the selected region, and the newly-generated superpixels and the selected region may be presented to the user via the user interface. Additionally, or alternatively, the specified quantity of superpixels and the selected region information may be provided as reference feedback to the first prediction model. In some embodiments, the generated superpixels may be provided as reference feedback to a second prediction model to train the second prediction model to perform image segmentation to identify one or more concepts in images. As an example, upon a user or automated confirmation (e.g., that the latest version of the superpixels for the image accurately represents the contours of the image), the latest version of the superpixels for the image may be provided as reference feedback to the second prediction model. As a further example, the second prediction model may perform pixel-level segmentation of the image (related to the concept) to predict segments representing the concept and segments representing one or more other concepts (or segments that do not represent the concept), and the second prediction model may assess the reference feedback against its predictions and update its configurations based on the assessment.

Figure 1C:
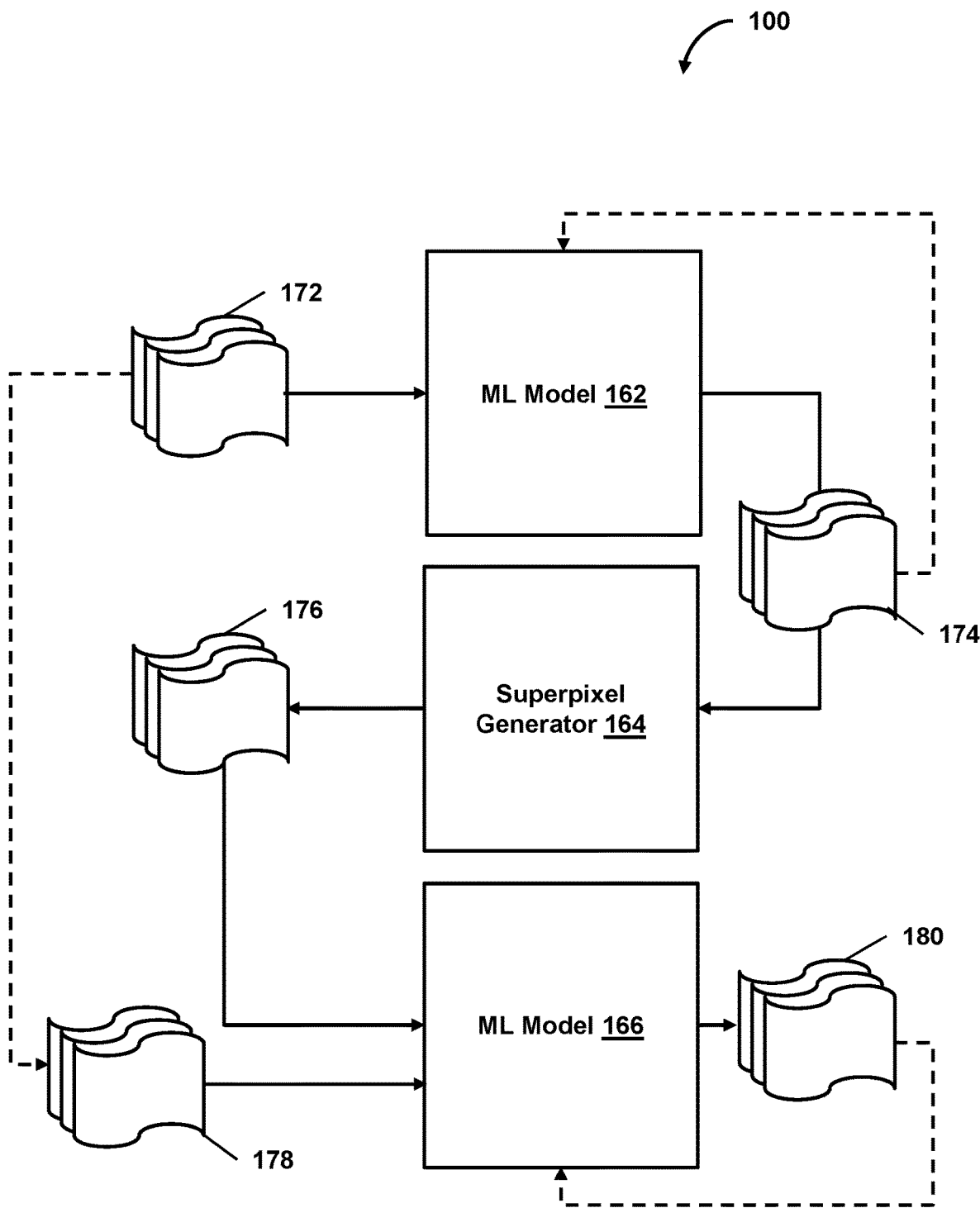

In one use case, with respect to FIG. 1C, one or more images 172 may be provided to the first prediction model (e.g., machine learning model 162), and the first prediction model may predict a quantity 174 of superpixels for each of the images 172. For each image 172, the predicted quantity 174 and the image 172 may be provided to superpixel generator 164 to generate superpixels 176. User feedback related to the predicted quantities 174 may be obtained and provided to the first prediction model, and the first prediction model may update its configurations based on the user feedback and the predicted quantities 174. In a further use case, one or more images 178 (e.g., images 172) may be provided to the second prediction model (e.g., machine learning model 166), and the second prediction model may generate a set of segments 180 for each of the images 178. As part of training the second prediction model, for each image 178, the superpixels 176 for the image 178 may be provided as reference feedback to the second prediction model, and the second prediction model may update its configurations based on the reference feedback and the set of segments 180 for the image.

In some embodiments, in response to a presentation of the image and the superpixels, feedback subsystem 116 may obtain user feedback indicating one or more superpixels that reflect the concept in the image. As an example, a user may identify which superpixels respectively represent the concept in the image (e.g., by selecting or unselecting superpixels via tapping, clicking, or providing other user inputs with respect to the superpixels). Feedback subsystem 116 may provide the user feedback as reference feedback to the second prediction model. Based on the reference feedback, the second prediction model may assess the predicted set of segments and update one or more portions of the second prediction model based on its assessment. As an example, the second prediction model may then update its configurations (e.g., weights, biases, or other parameters) based on the assessment. In one use case, where the second prediction model is a neural network, connection weights may be adjusted to reconcile differences between the neural network's prediction (e.g., the segments of the segment set that were predicted to reflect the concept) and the user feedback's indications (e.g., the superpixels indicated by the user feedback to reflect the concept).

In a further use case, the user may select a subset of superpixels that the user deems to be a positive example of a first concept in the image, a subset of superpixels that the user deems to be a positive example of a second concept in the image, and so on. Additionally, or alternatively, the user may select a subset of superpixels that the user deems to be a negative example of the first concept in the image, a subset of superpixels that the user deems to be a negative example of the second concept in the image, and so on. In one use case, with respect to FIG. 3B, the user may identify superpixels within set 302 in image 300 as a positive example of a first concept (representing an animal). The user may also identify superpixels within set 304 in image 300 as a positive example of a second concept (representing a log). In another use case, with respect to FIG. 3B, the user may identify superpixels outside set 302 as a negative example of the first concept (e.g., negative example of an animal). The user may also identify superpixels outside set 304 as a negative example of the second concept (e.g., negative example of a log). One or more of the foregoing subsets of superpixels (e.g., their respective pixels or other information indicating the shape, size, or location of such superpixels) may be provided as reference feedback to the second prediction model to train the second prediction model (e.g., training the second prediction model to generate segments that more accurately represent the contours of the concept(s) in the image).

Examples Flowcharts

Figure 5:
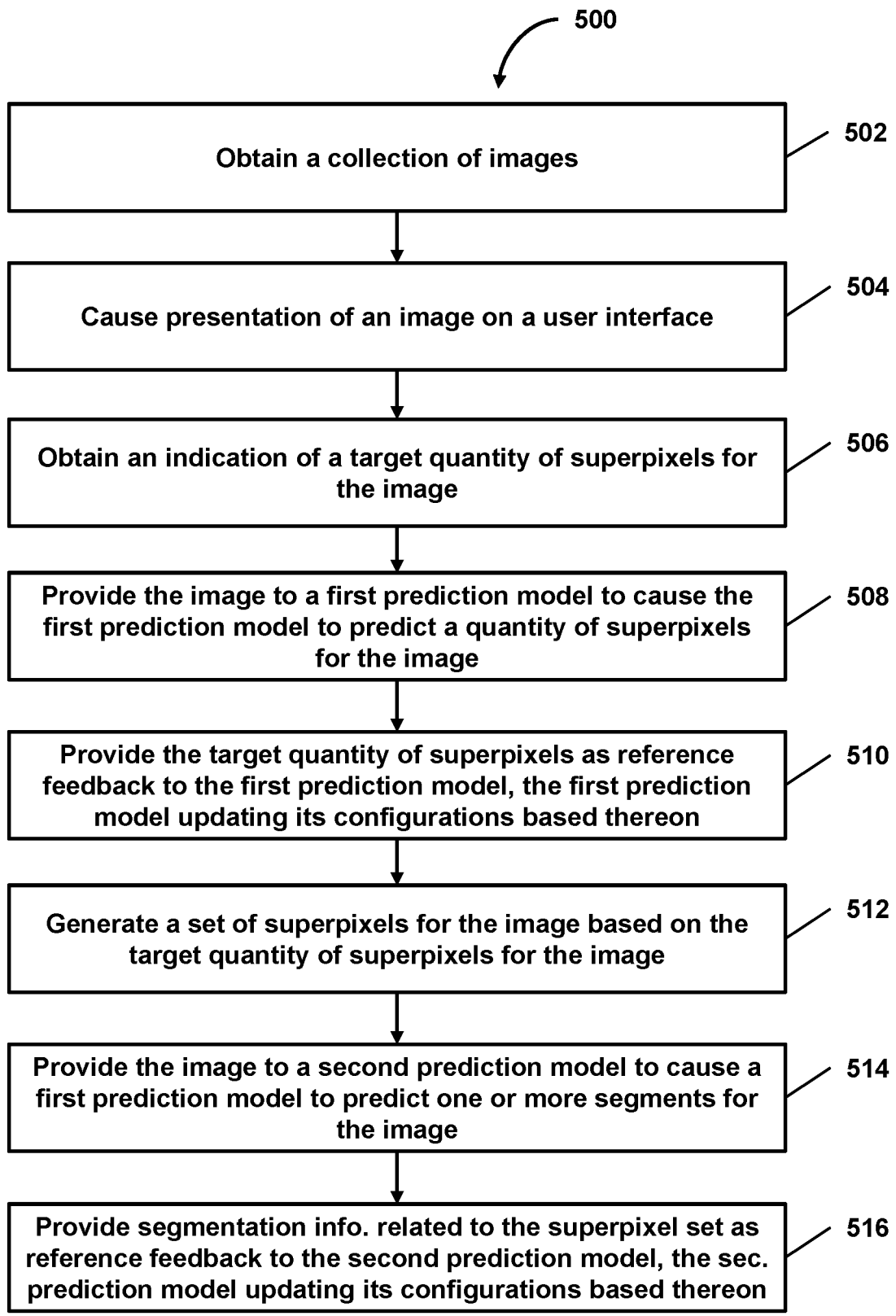
FIG. 5 shows a flowchart of a method of facilitating model-based image labeling or segmentation in accordance with one or more embodiments.
Figure 6:
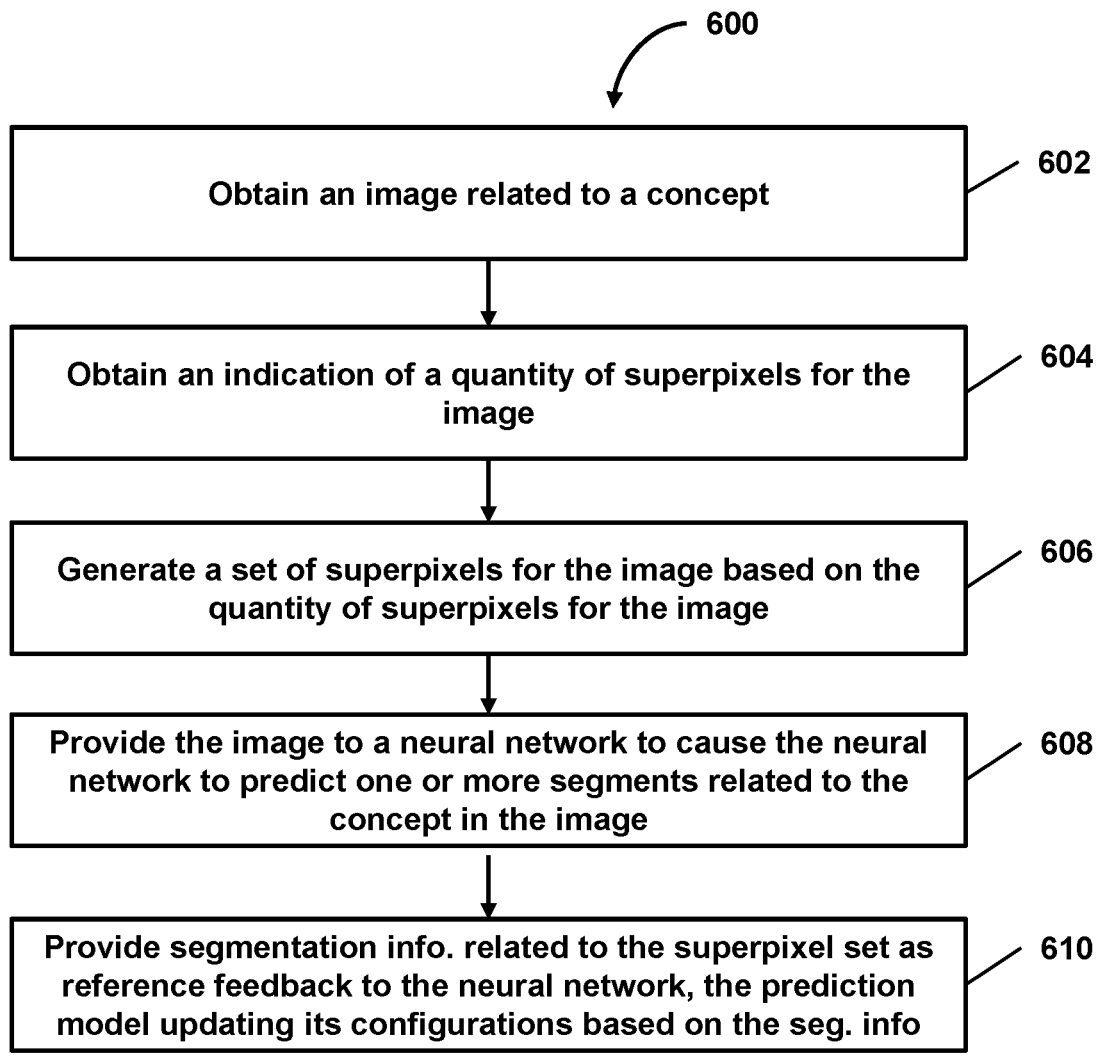
FIG. 6 shows a flowchart of a method of facilitating model-based segmentation with respect to a concept in an image, in accordance with one or more embodiments.

FIGS. 5-6 are example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 5 shows a flowchart of a method 500 of facilitating model-based image labeling or segmentation, in accordance with one or more embodiments.

In an operation 502, a collection of images may be obtained. As an example, the collection of images may be used to train one or more prediction models. In one use case, one or more of the images may relate to a given concept. Concepts may include objects, patterns, current states, or other concept identifiable in an image, audio, video, or other content item. Operation 502 may be performed by a subsystem that is the same as or similar to labeling subsystem 112, in accordance with one or more embodiments.

In an operation 504, an image may be provided on a user interface for presentation to a user. As an example, the image may relate to a given concept. The image may be presented to the user to solicit feedback from the user, one or more interactions of the user, or other input. Operation 504 may be performed by a subsystem that is the same as or similar to presentation subsystem 118, in accordance with one or more embodiments.

In an operation 506, an indication of a target quantity of superpixels for the image may be obtained. As an example, the target quantity indication may be a range or other estimate provided by a user, an estimate generated by a neural network or other prediction model, etc. As another example, the indication of the target quantity of superpixels may be obtained based on the presentation of the image on the user interface (e.g., to solicit user input indicating the target quantity of superpixels). Operation 506 may be performed by a subsystem that is the same as or similar to feedback subsystem 116, in accordance with one or more embodiments.

In an operation 508, the image may be provided to a first prediction model. Based on the image, the first prediction model may be configured to predict a quantity of superpixels for the image. As an example, superpixels may be generated for the image (e.g., a video frame or other image) via BASS, SLIC, or other techniques based on the predicted quantity of superpixels. Operation 508 may be performed by a subsystem that is the same as or similar to labeling subsystem 112, in accordance with one or more embodiments.

In an operation 510, the target quantity of superpixels may be provided as reference feedback to the first prediction model. Based on the target quantity of superpixels, the first prediction model may update one or more of its configurations (e.g., weights, biases, etc.). As an example, the target quantity of superpixels may be provided as reference feedback to the first prediction model to cause the first prediction model to assess the predicted quantity of superpixels (e.g., against the target quantity of superpixels). The first prediction model may be configured to update one or more its configurations based on the assessment of the predicted quantity of superpixels. Operation 510 may be performed by a subsystem that is the same as or similar to feedback subsystem 116, in accordance with one or more embodiments.

In an operation 512, a set of superpixels for the image may be generated based on the target quantity of superpixels for the image. As an example, superpixels may be generated for the image via BASS, SLIC, or other techniques based on the target quantity of superpixels. Operation 512 may be performed by a subsystem that is the same as or similar to labeling subsystem 112, in accordance with one or more embodiments.

In an operation 514, the image may be provided to a second prediction model to cause the second prediction model to predict one or more segments for the image. Operation 514 may be performed by a subsystem that is the same as or similar to segmentation subsystem 114, in accordance with one or more embodiments.

In an operation 516, segmentation information related to the set of superpixels may be provided as reference feedback to the second prediction model. Based on the segmentation information, the second prediction model may update one or more of its configurations (e.g., weights, biases, etc.). As an example, the segmentation information may be provided as reference feedback to the second prediction model to cause the second prediction model to assess the predicted segments for the image (e.g., against the segmentation information). The second prediction model may be configured to update one or more its configurations based on the assessment of the predicted segments. Operation 516 may be performed by a subsystem that is the same as or similar to feedback subsystem 116, in accordance with one or more embodiments.

FIG. 6 shows a flowchart of a method 600 of facilitating model-based segmentation with respect to a concept in an image, in accordance with one or more embodiments.

In an operation 602, an image related to a concept may be obtained. Operation 602 may be performed by a subsystem that is the same as or similar to labeling subsystem 112, in accordance with one or more embodiments.

In an operation 604, an indication of a target quantity of superpixels for the concept may be obtained. As an example, the target quantity indication may be a range or other estimate provided by a user, an estimate generated by a neural network or other prediction model, etc. As another example, the indication of the target quantity of superpixels may be obtained based on the presentation of the image on the user interface (e.g., to solicit user input indicating the target quantity of superpixels). Operation 604 may be performed by a subsystem that is the same as or similar to feedback subsystem 116, in accordance with one or more embodiments.

In an operation 606, a set of superpixels for the image may be generated based on the target quantity of superpixels. As an example, the superpixel set may include a subset of superpixels reflecting the concept in the image, a subset of superpixels reflecting one or more other concepts in the image, or other subsets of superpixels reflecting one or more other portions of the image. As another example, superpixels may be generated for the image via BASS, SLIC, or other techniques based on the target quantity of superpixels. Operation 606 may be performed by a subsystem that is the same as or similar to labeling subsystem 112, in accordance with one or more embodiments.

In an operation 608, the image may be provided to a prediction model to cause the prediction model to predict one or more segments related to the concept in the image. As an example, the predicted segments may include a combination of segments of different sizes or shapes that reflect the concept in the content item. Operation 608 may be performed by a subsystem that is the same as or similar to segmentation subsystem 114, in accordance with one or more embodiments.

In an operation 610, segmentation information related to the set of superpixels may be provided as reference feedback to the prediction model. Based on the segmentation information, the prediction model may update one or more of its configurations (e.g., weights, biases, etc.). As an example, the segmentation information may be provided as reference feedback to the prediction model to cause the prediction model to assess the predicted segments for the image (e.g., against the segmentation information). The prediction model may be configured to update one or more its configurations based on the assessment of the predicted segments. Operation 610 may be performed by a subsystem that is the same as or similar to feedback subsystem 116, in accordance with one or more embodiments.

In some embodiments, the various computers and subsystems illustrated in FIG. 1 may include one or more computing devices that are programmed to perform the functions described herein. The computing devices may include one or more electronic storages (e.g., prediction database(s) 132, which may include training data database(s) 134, model database(s) 136, etc., or other electric storages), one or more physical processors programmed with one or more computer program instructions, and/or other components. The computing devices may include communication lines or ports to enable the exchange of information with a network (e.g., network 150) or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-118 or other subsystems. The processors may be programmed to execute computer program instructions by software; hardware; firmware;

some combination of software, hardware, or firmware; and/or other mechanisms for configuring processing capabilities on the processors.

It should be appreciated that the description of the functionality provided by the different subsystems 112-118 described herein is for illustrative purposes, and is not intended to be limiting, as any of subsystems 112-118 may provide more or less functionality than is described. For example, one or more of subsystems 112-118 may be eliminated, and some or all of its functionality may be provided by other ones of subsystems 112-118. As another example, additional subsystems may be programmed to perform some or all of the functionality attributed herein to one of subsystems 112-118.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method comprising: obtaining a content item (e.g., image or other content item) related to a concept; providing the content item to a prediction model to cause the prediction model to generate one or more predictions related to the content item; and providing reference feedback to the prediction model to cause the prediction model to update one or more portions of the prediction model.

2. The method of embodiment 1, further comprising: obtaining an indication of a target quantity of segments for the content item; providing the content item to the prediction model to cause the prediction model to predict a quantity of segments for the content item; and providing the target quantity of segments as reference feedback to the prediction model, the prediction model updating the one or more portions of the prediction model based on the predicted quantity of segments, the target quantity of segments, or other information.

3. The method of any of embodiments 1-2, further comprising: obtaining a first indication of a first target quantity of segments for a first region of the content item and a second indication of a second target quantity of segments for a second region of the content item.

4. The method of embodiment 3, further comprising: providing the first target quantity of segments as reference feedback to the prediction model, the prediction model updating the one or more portions of the prediction model based on a first predicted quantity of segments for the first region, the first target quantity of segments for the first region, or other information; and providing the second target quantity of segments as reference feedback to the prediction model, the prediction model updating the one or more portions of the prediction model based on a second predicted quantity of segments for the second region, the second target quantity of segments for the second region, or other information 5. The method of any of embodiments 3-4, further comprising: generating an initial set of segments for the content item; causing presentation of the initial set of segments over the content item; and obtaining, based on the presentation of the initial set of segments, the first indication of the first target quantity of segments for the first region.

6. The method of any of embodiments 3-5, further comprising: generating a first set of segments for the first region based on the first target quantity of segments for the first region.

7. The method of embodiment 6, further comprising: causing presentation of the first set of segments over the first region of the content item; and subsequent to the presentation of the first set of segments, obtaining the second indication of the second target quantity of segments for the second region.

8. The method of embodiment 7, further comprising: generating a second set of segments for the second region based on the second target quantity of segments for the second region; and causing presentation of the second set of segments over the second region of the content item.

9. The method of any of embodiments 3-8, wherein the second region is a subset of the first region such that the first region comprises the second region and one or more other regions.

10. The method of any of embodiments 3-8, wherein the first and second regions of the content item comprises at least one common region of the content item.

11. The method of any of embodiments 3-8, wherein the first and second regions of the content item are mutually exclusive of one another.

12. The method of any of embodiments 1-11, wherein the content item is related to a concept, the method further comprising: obtaining an indication of a quantity of segments for the content item; generating a set of segments for the content item based on the quantity of segments for the content item; providing the content item to at least one prediction model to cause the at least one prediction model to predict one or more segments related to the concept in the content item; and providing segmentation information related to the set of segments for the content item as reference feedback to the at least one prediction model, the at least one prediction model updating one or more portions of the at least one prediction model based on the predicted segments, the segmentation information, or other information.

13. The method of embodiment 12, further comprising: generating at least one initial set of segments for the content item; causing presentation of the at least one initial set of segments over the content item; and obtaining, based on the presentation of the at least one initial set of segments, the indication of the quantity of segments for the content item.

14. The method of embodiment 13, wherein obtaining the indication of the quantity of segments for the content item comprises: obtaining, based on the presentation of the at least one initial set of segments, a first indication of a first quantity of segments for a first region of the content item; generating a first set of segments for the first region based on the first quantity of segments for the first region; causing presentation of the first set of segments over the first region of the content item; and subsequent to the presentation of the first set of segments, obtaining a second indication of a second quantity of segments for a second region of the content item that is different from the first region of the content item, and wherein generating the set of segments for the content item comprises generating the set of segments for the content item based on the first and second quantities of segments.

15. The method of any of embodiments 12-14, further comprising: obtaining user feedback indicating one or more segments of the set of segments that reflect the concept in the content item; and providing, based on the user feedback, the segmentation information to the at least one prediction model to cause the at least one prediction model to assess the one or more predicted segments against the segmentation information.

16. The method of any of embodiments 12-15, further comprising: obtaining a first user selection of at least one segment of the set of segments as a positive example of the concept in the content item and a second user selection of at least another segment of the set of segments as a negative example of the concept in the content item; and providing, based on the first and second user selections, the segmentation information the at least one prediction model to cause the at least one prediction model to assess the one or more predicted segments against the segmentation information.

17. The method of any of embodiments 1-16, wherein the prediction model comprises a neural network or other machine learning model.

18. The method of any of embodiments 1-17, wherein each of the set(s) of segments comprises a combination of segments of different sizes or shapes that reflect the concept in the content item.

19. A tangible, non-transitory, machine-readable medium storing instructions that when executed by a data processing apparatus cause the data processing apparatus to perform operations comprising those of any of embodiments 1-18.

20. A system comprising: one or more processors; and memory storing instructions that when executed by the processors cause the processors to effectuate operations comprising those of any of embodiments 1-18.

What is claimed is:

1. A method of facilitating reduction of computational resource usage related to image labeling and/or segmentation, the method being implemented by a computer system that comprises one or more processors executing computer program instructions that, when executed, perform the method, the method comprising:
   obtaining a collection of images comprising 1000 or more images; and
   with respect to each image of the 1000 or more images:
      causing presentation of the image on a user interface;
      obtaining, based on the presentation of the image, an indication of a target quantity of superpixels for the image;
      providing the image to a first neural network to cause the first neural network to predict a quantity of superpixels for the image; and
      providing the target quantity of superpixels as reference feedback to the first neural network to cause the first neural network to assess the predicted quantity of superpixels against the target quantity of superpixels, the first neural network updating one or more configurations of the first neural network based on the first neural network's assessment of the predicted quantity of superpixels.

2. The method of claim 1, further comprising, with respect to each image of the 1000 or more images:
   obtaining a first indication of a first target quantity of superpixels for a first region of the image and a second indication of a second target quantity of superpixels for a second region of the image that is different from the first region of the image;
   providing the first target quantity of superpixels as reference feedback to the first neural network, the first neural network updating the one or more configurations based on (i) a first predicted quantity of superpixels for the first region and (ii) the first target quantity of superpixels for the first region; and
   providing the second target quantity of superpixels as reference feedback to the first neural network, the first neural network updating the one or more configurations based on (i) a second predicted quantity of superpixels for the second region and (ii) the second target quantity of superpixels for the second region.

3. The method of claim 2, further comprising, with respect to each image of the 1000 or more images:
   generating an initial set of superpixels for the image;
   causing presentation of the initial set of superpixels over the image; and
   obtaining, based on the presentation of the initial set of superpixels, the first indication of the first target quantity of superpixels for the first region.

4. The method of claim 3, further comprising:
   generating a first set of superpixels for the first region based on the first target quantity of superpixels for the first region;
   causing presentation of the first set of superpixels over the first region of the image; and
   subsequent to the presentation of the first set of superpixels, obtaining the second indication of the second target quantity of superpixels for the second region.

5. The method of claim 4, further comprising:
   subsequent to the second target quantity being provided to the first neural network, generating a second set of superpixels for the second region based on the second target quantity of superpixels for the second region; and
   causing presentation of the second set of superpixels over the second region of the image.

6. The method of claim 5, wherein (i) the second region is a subset of the first region such that the first region comprises the second region and one or more other regions or (ii) the first and second regions of the image comprises at least one common region of the image.

7. The method of claim 5, wherein the first and second regions of the image are mutually exclusive of one another.

8. The method of claim 1, further comprising:
   subsequent to the updating of the one or more configurations of the first neural network, providing a subsequent image related to a concept to the first neural network to cause the first neural network to predict a quantity of superpixels for the subsequent image;
   generating a set of superpixels for the subsequent image based on the predicted quantity of superpixels for the subsequent image;
   providing the subsequent image to a second neural network to cause the second neural network to predict one or more segments related to the concept in the subsequent image; and
   providing segmentation information related to the set of superpixels for the subsequent image as reference feedback to the second neural network to cause the second neural network to assess the one or more predicted segments against the segmentation information, the second neural network updating one or more configurations of the second neural network based on the second neural network's assessment of the one or more predicted segments.

9. The method of claim 1, further comprising, with respect to each image of the 1000 or more images:
   generating a set of superpixels for the image based on the target quantity of superpixels for the image;
   causing presentation of the set of superpixels over the image;

obtaining user feedback indicating multiple superpixels of the set of superpixels that reflect a concept in the image;

providing the image to a second neural network to cause the second neural network to predict one or more segments related to the concept in the image; and providing, based on the user feedback, segmentation information related to the concept to the second neural network to cause the second neural network to assess the one or more predicted segments against the segmentation information, the second neural network updating one or more configurations of the second neural network based on the second neural network's assessment of the one or more predicted segments.

10. The method of claim 1, further comprising, with respect to each image of the 1000 or more images:

generating a set of superpixels for the image based on the predicted quantity of superpixels for the image;

causing presentation of the set of superpixels over the image;

providing the image to a second neural network to cause the second neural network to predict one or more segments related to a concept in the image;

obtaining a first user selection of at least one superpixel of the set of superpixels as a positive example of the concept in the image and a second user selection of at least another superpixel of the set of superpixels as a negative example of the concept in the image; and providing, based on the first and second user selections, segmentation information related to the concept to the second neural network to cause the second neural network to assess the one or more predicted segments against the segmentation information, the second neural network updating one or more configurations of the second neural network based on the second neural network's assessment of the one or more predicted segments.

11. A system comprising:

a computer system that comprises one or more processors programmed with computer program instructions that, when executed, cause the computer system to:

obtain an indication of a target quantity of segments for an image;

provide the image to a prediction model to cause the prediction model to predict a quantity of segments for the image; and provide the target quantity of segments as reference feedback to the prediction model to cause the prediction model to assess the predicted quantity of segments against the target quantity of segments, the prediction model updating one or more portions of the prediction model based on the prediction model's assessment of the predicted quantity of segments.

12. The system of claim 11, wherein the computer system is caused to:

obtain a first indication of a first target quantity of segments for a first region of the image and a second indication of a second target quantity of segments for a second region of the image that is different from the first region of the image;

provide the first target quantity of segments as reference feedback to the prediction model, the prediction model updating the one or more portions of the prediction model based on (i) a first predicted quantity of segments for the first region and (ii) the first target quantity of segments for the first region; and provide the second target quantity of segments as reference feedback to the prediction model, the prediction model updating the one or more portions of the prediction model based on (i) a second predicted quantity of segments for the second region and (ii) the second target quantity of segments for the second region.

13. The system of claim 12, wherein the computer system is caused to:

generate an initial set of superpixels for the image;

cause presentation of the initial set of superpixels over the image; and obtain, based on the presentation of the initial set of superpixels, the first indication of the first target quantity of superpixels for the first region.

14. The system of claim 13, wherein the computer system is caused to:

generate a first set of superpixels for the first region based on the first target quantity of superpixels for the first region;

cause presentation of the first set of superpixels over the first region of the image;

subsequent to the presentation of the first set of superpixels, obtain the second indication of the second target quantity of superpixels for the second region;

subsequent to the second target quantity being provided to the prediction model, generate a second set of superpixels for the second region based on the second target quantity of superpixels for the second region; and cause presentation of the second set of superpixels over the second region of the image.

15. A method implemented by one or more processors executing computer program instructions that, when executed, perform the method, the method comprising:

obtaining an image related to a concept;

obtaining an indication of a quantity of superpixels for the image;

generating a set of superpixels for the image based on the quantity of superpixels for the image;

providing the image to a neural network to cause the neural network to predict one or more segments related to the concept in the image; and providing segmentation information related to the set of superpixels for the image as reference feedback to the neural network to cause the neural network to assess the one or more predicted segments against the segmentation information, the neural network updating one or more portions of the neural network based on the neural network's assessment of the one or more predicted segments.

16. The method of claim 15, further comprising:

generating an initial set of superpixels for the image;

causing presentation of the initial set of superpixels over the image; and obtaining, based on the presentation of the initial set of superpixels, the indication of the quantity of superpixels for the image.

17. The method of claim 16, wherein obtaining the indication of the quantity of superpixels for the image comprises:

obtaining, based on the presentation of the initial set of superpixels, a first indication of a first quantity of superpixels for a first region of the image;

generating a first set of superpixels for the first region based on the first quantity of superpixels for the first region;

causing presentation of the first set of superpixels over the first region of the image; and subsequent to the presentation of the first set of superpixels, obtaining a second indication of a second quantity of superpixels for a second region of the image that is different from the first region of the image, and wherein generating the set of superpixels for the image comprises generating the set of superpixels for the image based on the first and second quantities of superpixels.

18. The method of claim 15, further comprising:

obtaining user feedback indicating one or more superpixels of the set of superpixels that reflect the concept in the image; and providing, based on the user feedback, the segmentation information to the neural network to cause the neural network to assess the one or more predicted segments against the segmentation information.

19. The method of claim 15, further comprising:

obtaining a first user selection of at least one superpixel of the set of superpixels as a positive example of the concept in the image and a second user selection of at least another superpixel of the set of superpixels as a negative example of the concept in the image; and providing, based on the first and second user selections, the segmentation information the neural network to cause the neural network to assess the one or more predicted segments against the segmentation information.

* * * * *